Feb. 2, 1932 — M. MICHALSKI — 1,843,830
LAWN MOWER SHARPENING DEVICE
Filed April 20, 1931
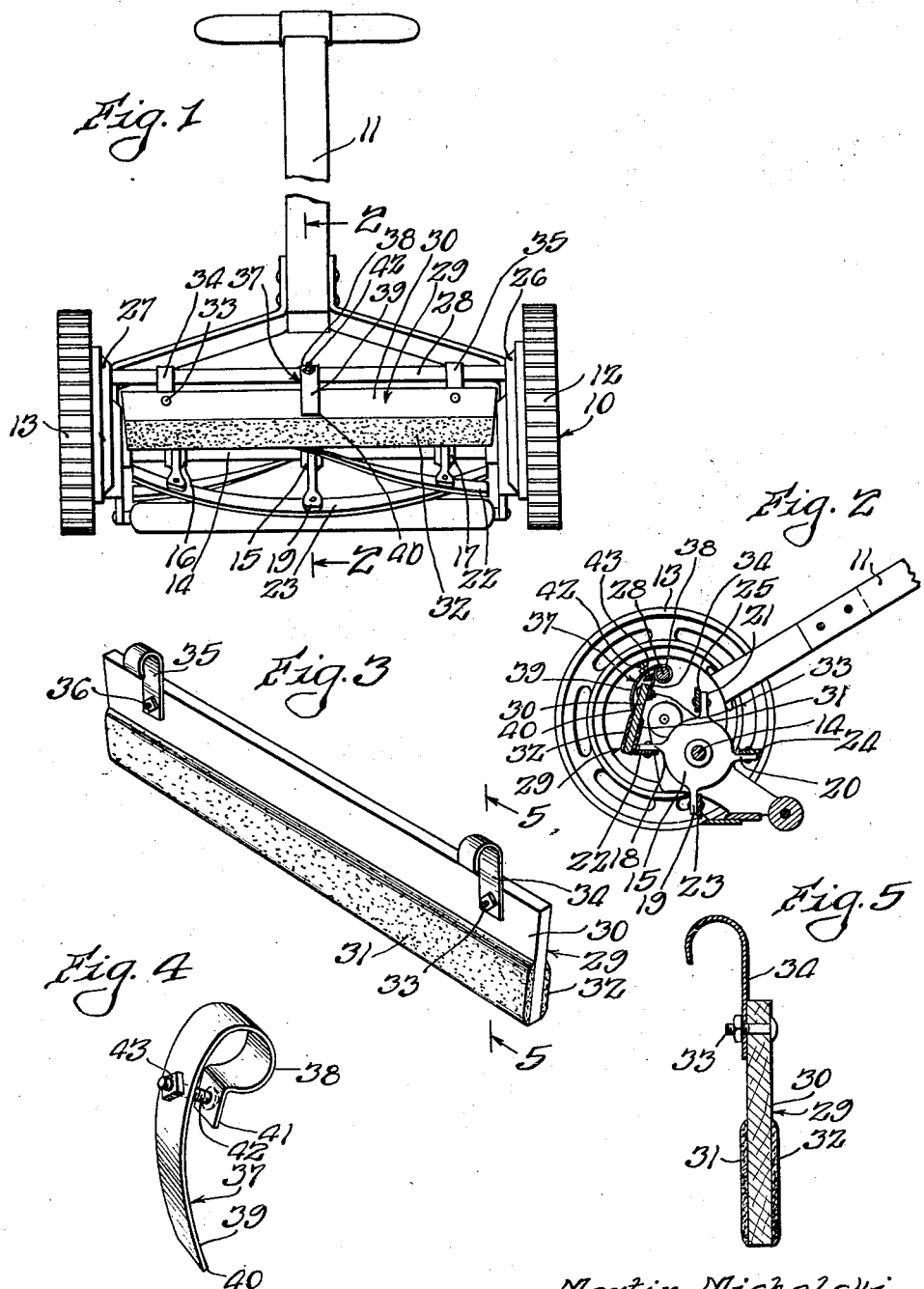
Martin Michalski, INVENTOR
BY Victor J. Evans & Co.
HIS ATTORNEYS Patented Feb. 2, 1932

1,843,830

UNITED STATES PATENT OFFICE

MARTIN MICHALSKI, OF NORTH CHICAGO, ILLINOIS

LAWN MOWER SHARPENING DEVICE

Application filed April 20, 1931. Serial No. 531,534.

This invention relates to certain novel improvements in lawn mower sharpening devices, and has for its principal object the provision of an improved construction of this character which will be highly efficient in use and economical in manufacture.

The salient object of this invention is to provide an improved device for sharpening the blades of a lawn mower.

Another object of the invention is to provide a sharpening device which may be detachably mounted on a lawn mower so that as the blades of the mower revolve they will engage the device and be sharpened thereby.

An additional object is to provide a device which is yieldably engaged by the revolving blades of the mower to bring about frictional engagement of the blades with the abrasive surface of the sharpening device.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a front elevational view of a typical lawn mower showing a preferred form of the invention mounted thereon;

Fig. 2 is a sectional detail view taken substantially on the line 2—2 in Fig. 1;

Fig. 3 is a perspective view of a preferred form of construction of the invention;

Fig. 4 is a perspective view of a clamping element embodied in the invention; and Fig. 5 is a sectional detail view taken substantially on the line 5—5 in Fig. 3.

Referring to the drawings wherein a preferred embodiment of the invention is depicted, there is generically indicated at 10 a typical lawn mower construction with which the handle structure 11 is associated. While in the present instance the mower 10 is illustrated as being a hand driven mower it is to be understood that the present invention might be used on power driven mowers without departing from the purview thereof.

Embodied in the lawn mower 10 are the usual wheels 12 and 13 with which are associated gears to drive the rotatable shaft 14. Mounted on the shaft 14 at intervals therealong are collars such as 15, 16 and 17 from which project arms such as 18, 19, 20 and 21, as may be seen by reference to Fig. 2. Mounted on the arms of the collars 15, 16 and 17 are the cutting blades 22, 23, 24, and 25. Extending between the gear housings 26 and 27, is a rod 28 on which my improved device is intended to be mounted, it being understood that the hereinbefore described manner of construction may be of any approved type since the same forms no part of this invention.

My improved device is generically indicated at 29 and is intended to be mounted on the rod 28 or like supporting member extending between the wheels of the mower. Indicated at 30 is a substantially rectangular plate which may be of any suitable material and in the present instance is shown as being made of wood. Adhesively secured to the sides of the plate 30 are abrasive surfaces 31 and 32 and these surfaces are provided by securing to the plate 30, by means of a suitable adhesive binding agent, a suitable abrasive dust or granulated substance such as emery, carborundum or the like. It has been found impracticable to provide rigid slabs of abrasive material since these are subject to cracking when used on the mower due to the impact of the blades and the shock thereof.

There is secured to the plate 30 by means of a bolt and nut structure 33 a hook element 34 and a similar hook element 35 is attached to the plate 30 by means of a bolt and nut structure 36. As shown in Fig. 1, these hook elements are mounted on the rod 28 so as to support the plate 30 and the abrasive surfaces therefrom.

Adapted to be mounted on the rod 28 so as to force one of the abrasive surfaces against the blades as the blades are rotated during the mowing operation is a spring clip 37 which includes a convoluted portion 38 that is adapted to receive the rod 28. The clip 37 includes an arcuate portion 39, the lower end 40 of which bears against the plate 30 as best shown in Fig. 2. Integral with the portion 38 is a depending portion 41 and extending through this portion 41 and the arcuate portion 39 is a threaded bolt 42 on which is provided, exteriorly of the arcuate portion 39, a nut 43.

It will be seen, therefore, that when the plate 30 is in position as shown in Figs. 1 and 2, and the spring clip member 37 disposed with the rod 28 extended through the section 38, the nut 43 and bolt 42 may be tightened to force the arcuate leaf portion 39 against the front face of the plate 30 so as to force the abrasive surface 31 against the blades of the mower as the same are rotated.

After the abrasive 31 has been worn away the clips or hooks 34 and 35 may be detached and the plate 30 turned so that the abrasive face 32 may then be used in the manner clearly illustrated for the face 31. It will be seen, therefore, that as the blades of the mower rotate the beveled cutting edges thereof will engage the abrasive face and, since the spring clip 37 forces the plate 30 inwardly toward the blades, the cutting edges of the blades will be sharpened as they engage the abrasive surface.

From the foregoing description of the invention it will be apparent that I have provided an improved sharpening device for lawn mowers which while being simple in construction and economical in manufacture effectively accomplishes its intended purpose.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claim.

Having thus described my invention what I claim as new and desire to protect by Letters Patent is:

A lawn mower sharpener comprising a plate, abrasive means adhesively secured to said plate, means for detachably mounting said plate on the mower in the path of movement of the blades, so that said blades during rotation will engage said abrasive means, and yieldable means for urging said plate toward the cutting blades whereby said blades will frictionally engage said abrasive means, said yieldable means including a leaf spring including a convoluted portion adapted to be mounted on the mower and including an arcuate portion engaging the front side of said plate to force said plate and said abrasive means toward the blades of the mower.

In testimony whereof I affix my signature.

MARTIN MICHALSKI.